US005872947A

United States Patent [19]
Narayan

[11] Patent Number: 5,872,947
[45] Date of Patent: Feb. 16, 1999

[54] INSTRUCTION CLASSIFICATION CIRCUIT CONFIGURED TO CLASSIFY INSTRUCTIONS INTO A PLURALITY OF INSTRUCTION TYPES PRIOR TO DECODING SAID INSTRUCTIONS

[75] Inventor: Rammohan Narayan, Austin, Tex.

[73] Assignee: Advanced Micro Devices, Inc.

[21] Appl. No.: 547,328

[22] Filed: Oct. 24, 1995

[51] Int. Cl.⁶ .................................................. G06F 9/30
[52] U.S. Cl. .......................................... 395/389; 395/391
[58] Field of Search ................................. 395/571, 800, 395/383, 389, 388, 385, 386, 380, 391

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,839,797 | 6/1989 | Katori et al. | 395/386 |
| 4,858,105 | 8/1989 | Kuriyama et al. | 395/582 |
| 5,167,026 | 11/1992 | Murray et al. | 395/386 |
| 5,202,967 | 4/1993 | Matsuzaki et al. | 395/388 |
| 5,226,126 | 7/1993 | McFarland et al. | 395/394 |
| 5,226,130 | 7/1993 | Favor et al. | 395/585 |
| 5,233,696 | 8/1993 | Suzuki | 395/389 |
| 5,235,686 | 8/1993 | Bosshart | 395/597 |
| 5,337,415 | 8/1994 | DeLano et al. | 395/389 |
| 5,371,864 | 12/1994 | Chuang | 395/386 |
| 5,394,558 | 2/1995 | Arakawa et al. | 395/387 |
| 5,394,559 | 2/1995 | Hemmie et al. | 348/13 |
| 5,430,851 | 7/1995 | Hirata et al. | 395/388 |
| 5,459,844 | 10/1995 | Eickemeyer et al. | 395/389 |
| 5,488,710 | 1/1996 | Sato et al. | 395/389 |
| 5,488,729 | 1/1996 | Vegesna et al. | 395/385 |
| 5,500,942 | 3/1996 | Eickemeyer et al. | 395/391 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," Byte, Jan. 1996, 4 pages.

Primary Examiner—William M. Treat
Assistant Examiner—Patrice L. Winder
Attorney, Agent, or Firm—Conley, Rose & Tayon, PC; B. Noel Kivlin; Lawrence J. Merkel

[57] ABSTRACT

An instruction classification circuit is provided which speculatively classifies potential instructions prior to the decode of these instructions. In parallel, predecode information associated with the plurality of instruction bytes is scanned to determine the valid instructions within the instruction bytes. Instruction classifications are then chosen from the speculatively generated classifications according to the valid instructions located. Instruction information may be determined prior to decoding the instructions. In one embodiment, instructions are classified as either single dispatch instructions or double dispatch instructions. A single dispatch instruction is dispatched to a single decode unit, while a double dispatch instruction is dispatched to a pair of decode units. Instructions utilizing a pair of decode units are detected prior to dispatch to decode units. Bussing between decode units included when double dispatch instructions are detected within the decode unit may be eliminated. Pipeline stalls created when instructions which were previously dispatched are redispatched due to the detection of double dispatch instructions at the decode stage may be eliminated.

21 Claims, 6 Drawing Sheets

U.S. PATENT DOCUMENTS

| | | | |
|---|---|---|---|
| 5,504,923 | 4/1996 | Ando | 395/392 |
| 5,509,130 | 4/1996 | Trauben et al. | 395/391 |
| 5,559,975 | 9/1996 | Christie et al. | 395/571 |
| 5,560,028 | 9/1996 | Sachs et al. | 395/800 |
| 5,566,298 | 10/1996 | Boggs et al. | 395/182.08 |
| 5,600,806 | 2/1997 | Brown et al. | 395/380 |
| 5,619,666 | 4/1997 | Coon et al. | 395/384 |
| 5,625,787 | 4/1997 | Mahin et al. | 395/380 |
| 5,630,083 | 5/1997 | Carbine et al. | 395/388 |
| 5,655,097 | 8/1997 | Witt et al. | 395/380 |
| 5,664,134 | 9/1997 | Gallup et al. | 395/381 |
| 5,689,672 | 11/1997 | Witt et al. | 395/389 |
| 5,696,955 | 12/1997 | Goddard et al. | 395/563 |

INSTRUCTION CLASSIFICATION CIRCUIT CONFIGURED TO CLASSIFY INSTRUCTIONS INTO A PLURALITY OF INSTRUCTION TYPES PRIOR TO DECODING SAID INSTRUCTIONS

BACKGROUND OF THE INVENTION

1. Field of the Invention

This invention relates to the field of superscalar microprocessors and, more particularly, to classifying instructions prior to decode of the instructions in order to more optimally utilize microprocessor resources.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. Memory elements (such as registers and arrays within the microprocessor) capture data values according to a clock signal which defines the clock cycle. For example, memory elements may capture their data values based upon a rising or falling edge of the clock signal.

Superscalar microprocessor manufacturers often design microprocessors according to the x86 microprocessor architecture. Due to the widespread acceptance in the computer industry of the x86 microprocessor architecture, superscalar microprocessors designed to execute x86 instructions may be suitable for use in many computer system configurations. The x86 instruction set is an example of a complex instruction set computer (CISC) instruction set. Certain CISC instructions are defined to perform complex operations which may require multiple clock cycles to complete. For example, a CISC instruction may utilize a memory operand (i.e. an operand value stored in a memory location as opposed to a register). Fetching the operand from memory may require several clock cycles prior to execution of the instruction upon the operand value. Additionally, a CISC instruction may specify several results to be stored in several different storage locations. Since execution units within a superscalar microprocessor are capable of conveying a finite number of results during a clock cycle, these several results add complexity. The number of results an instruction specifies may affect the number of clock cycles required to execute the instruction.

The x86 instruction set additionally defines instructions which are variable length. A variable length instruction set is an instruction set in which the various instructions comprise differing numbers of bytes. One instruction within the instruction set may be specified by a single byte, while other instructions may be specified by more than one byte. An x86 instruction, for example, may include zero to five prefix bytes, one to two opcode bytes, an optional addressing mode byte, an optional scale-index-base byte (SIB byte), zero to four bytes of displacement, and zero to four bytes of immediate data. Prefix bytes allow modification of the instruction defined by the opcode bytes. The optional addressing mode byte may specify several addressing modes for the instruction. The SIB byte may define further modifications to the addressing mode. Displacement and immediate data may be encoded within the instruction for use with certain addressing modes. Thus, an instruction may be defined by as little as one opcode byte or numerous bytes may define the instruction. More information regarding the x86 microprocessor architecture may be found within the publication entitled: "PC Programmer's Technical Reference: The Processor and Coprocessor" by Hummel, Ziff-Davis Press, Emeryville, Calif., 1992. This publication is incorporated herein by reference in its entirety. It is noted that the x86 microprocessor architecture is only one example of a variable instruction set. Other variable length instruction sets may be defined.

Variable length CISC instruction sets present a large problem for superscalar microprocessors. Because the instructions are variable length, it is difficult to determine instruction boundaries quickly. Superscalar microprocessors attempt to execute multiple instructions per clock cycle, so quickly determining instruction boundaries is important to the overall performance of the microprocessor. Additionally, superscalar microprocessors may generate several simpler instructions from certain more complex CISC instructions in order to simplify the microprocessor's execution units. The simpler instructions, when considered together, perform an equivalent function to the more complex instruction. Such instructions therefore utilize several execution units. Allocating more than one execution unit to an instruction after instructions have been decoded is a complex process which may be difficult to implement correctly. Other information regarding instructions being fetched and transferred to a decode unit or units within a microprocessor may be useful to determine early in the instruction processing pipeline.

Generally speaking, a superscalar microprocessor may implement an instruction processing pipeline. By employing a pipeline, the processing of instructions may be overlapped such that the number of instructions executed during a period of time is larger than the number of instructions that could be individually processed during that time period. For example, an instruction may be executed while a second instruction is decoded and a third instruction is fetched from memory. Superscalar microprocessors may operate upon multiple instructions in each stage of the instruction processing pipeline or, alternatively, may employ multiple instruction processing pipelines.

Instruction processing pipelines may include stages which fetch an instruction, decode the instruction and fetch the operands, execute the instruction, and write the result to the destination. Each stage may be performed in multiple clock cycles (and thus each stage may comprise multiple stages). Therefore the instruction processing pipeline may comprise a fetch stage or stages, a decode stage or stages, an execute stage or stages, and a writeback stage or stages. Instructions pass from the fetch stage through the decode and execute stage to the writeback stage. As an example of multiple stages within these generalized stages, the execute stage may include a memory operand fetch stage for fetching operand values stored in a memory location and a stage in which the instruction is executed. Instruction not including a memory operand may bypass the memory operand fetch stage. It would be desirable to have a microprocessor which may detect important instruction information earlier in the instruction processing pipeline than the decode stage or stages. It would be particularly desirable to have a microprocessor configured to detect complex instructions early in the instruction processing pipeline.

SUMMARY OF THE INVENTION

The problems outlined above are in large part solved by an instruction classification circuit according to the present invention. The present instruction classification circuit operates upon a plurality of instruction bytes within the fetch stage of the instruction processing pipeline. Potential instructions are speculatively classified prior to the decode of these instructions. A potential instruction is defined to begin at each byte within the plurality of instruction bytes. In parallel, predecode information associated with the plurality of instruction bytes is scanned to determine the valid instructions within the instruction bytes. Instruction classifications are then chosen from the speculatively generated classifications according to the valid instructions located. For example, the first valid instruction may begin at the third of the plurality of instruction bytes. Therefore, the speculative classification associated with a potential instruction beginning at the third of the plurality of instruction bytes is selected and conveyed to an instruction alignment unit which aligns the instructions to decode units. Advantageously, instruction information may be determined prior to decoding the instructions. Additionally, the number of cascaded levels of logic may be reduced by performing the instruction classification in parallel with detecting instructions instead of serially performing these tasks.

In one embodiment, instructions are classified as either single dispatch instructions or double dispatch instructions. A single dispatch instruction is dispatched to a single decode unit, while a double dispatch instruction is dispatched to a pair of decode units. Advantageously, instructions utilizing a pair of decode units are detected prior to dispatch to decode units. Bussing between decode units included when double dispatch instructions are detected within the decode unit may advantageously be eliminated. Pipeline stalls created when instructions which were previously dispatched are redispatched due to the detection of double dispatch instructions at the decode stage may be eliminated. Instead, the instructions which were previously redispatched are not dispatched initially. Instead, double dispatch instructions are detected and dispatched to a pair of decode units initially.

Broadly speaking, the present invention contemplates a method of classifying an instruction into one of a plurality of instruction types comprising at least two steps. First, one of the plurality of instruction types is speculatively selected. The instruction belongs to the selected instruction type, and the selection is performed in parallel with locating the instruction within a plurality of contiguous instruction bytes. Second, the speculative selection is verified by scanning predecode information associated with the plurality of contiguous instruction bytes to locate the instruction.

The present invention further contemplates an instruction classification circuit configured to classify instructions within a plurality of instruction bytes into a plurality of instruction types. The instruction classification circuit comprises a plurality of instruction detector circuits coupled to a selection device. Each one of the plurality of instruction detector circuits is configured to classify an instruction beginning at a respective one of the plurality of instruction bytes into one of the plurality of instruction types. Furthermore, each one of the plurality of instruction detector circuits is configure to convey a signal indicative of one of the plurality of instruction types. The selection device is configured to select a plurality of output signals from a plurality of the signals from the detector circuits. The selection is performed according to which ones of the plurality of instruction bytes are the beginning of an instruction.

BRIEF DESCRIPTION OF THE DRAWINGS

Other objects and advantages of the invention will become apparent upon reading the following detailed description and upon reference to the accompanying drawings in which.

Figure 1:
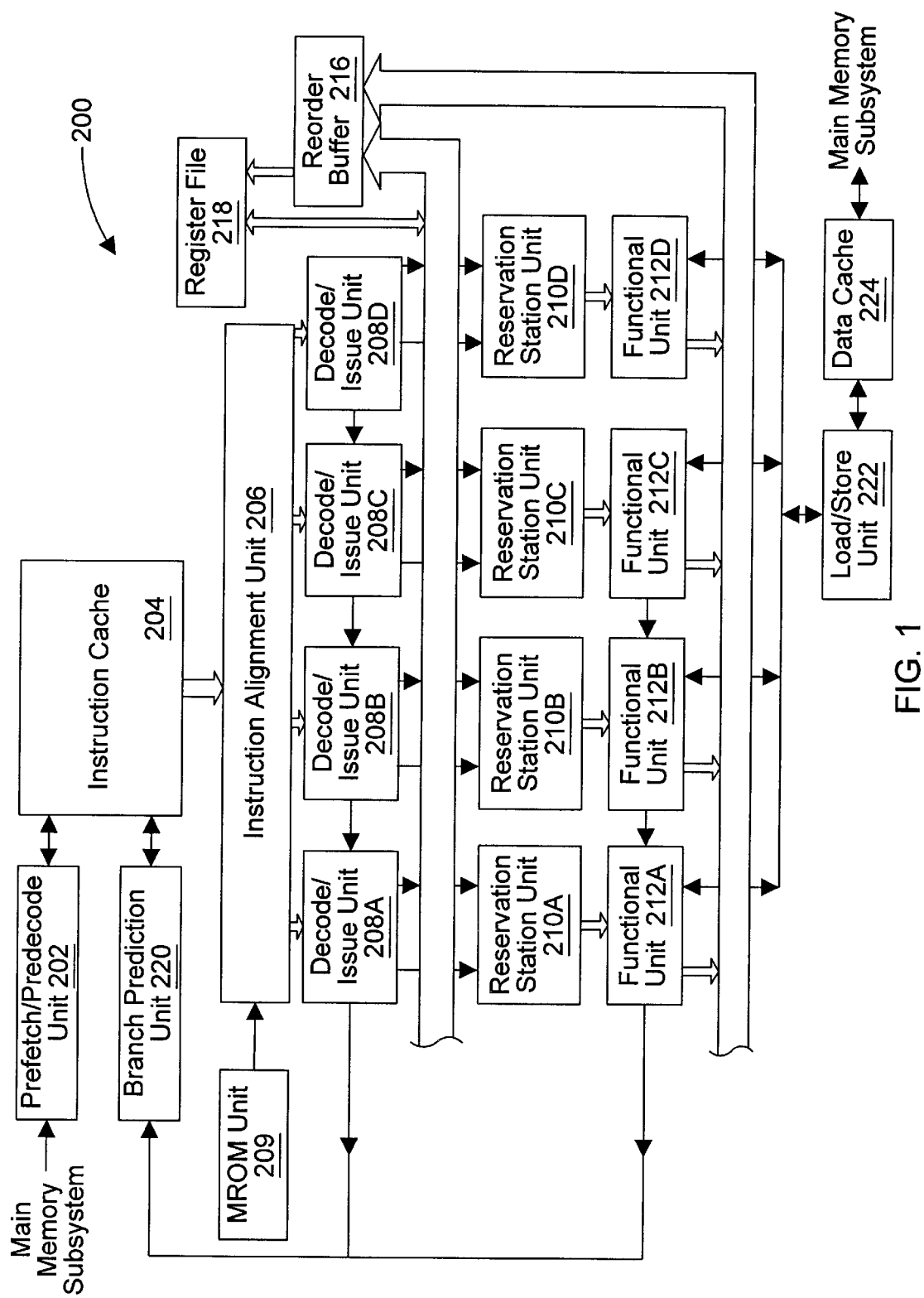
FIG. 1 is a block diagram of one embodiment of a superscalar microprocessor according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar microprocessor 200 including an instruction cache 204 is shown. As illustrated in the embodiment of FIG. 1, superscalar microprocessor 200 includes a prefetch/predecode unit 202 and a branch prediction unit 220 coupled to instruction cache 204. An instruction alignment unit 206 is coupled between instruction cache 204 and a plurality of decode units 208A–208D (referred to collectively as decode units 208). Each decode unit 208A–208D is coupled to respective reservation station units 210A–210D (referred to collectively as reservation stations 210), and each reservation station 210A–210D is coupled to a respective functional unit 212A–212D (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Instruction cache 204 additionally includes logic circuits configured to classify instructions into instruction types. An instruction is "classified" by performing a relatively small amount of logic upon the instruction bytes forming the instruction in order to determine the instruction type to which that instruction belongs. Instruction types are broad groups of instructions which share at least one similar property. In one embodiment, two instruction types are defined. According to this embodiment, an instruction may be classified as a single dispatch instruction type or a double dispatch instruction type. Single dispatch instructions are instructions which may be executed by a single execution unit. Conversely, double dispatch instructions are instructions which utilize more than one execution unit to complete their operation. Double dispatch instructions are more complex instructions within the instruction set of microprocessor 200. Double dispatch instructions may produce a plurality of results, or may perform multiple dissimilar operations. The dissimilar operations may be more naturally performed as separate operations (as if the operations are actually different instructions). In one embodiment, single dispatch instructions are dispatched to one decode unit 208A–208D while double dispatch instructions are dispatched to two decode units 208.

In one embodiment, instructions are classified in a speculative manner. As instruction bytes are fetched from instruction cache 204, the boundaries of the instructions are not yet known. Predecode information from predecode unit 202 indicates the boundaries of the instructions, but the predecode information is processed in order to select valid instruction bytes and to determine the order of instructions (i.e. how many valid instructions are before the instruction indicated by a particular start bit). In parallel with the processing of predecode information, sets of instruction bytes are classified as if a particular byte within the set is the beginning of an instruction. A signal is generated indicative of which type of instruction the group of bytes represents. The signals associated with sets of instruction bytes in which the particular byte actually corresponds to the beginning of an instruction are selected according to the processing of predecode information. In this manner, the classification of instructions is performed in parallel with the determination of valid instructions within a group of instruction bytes. Advantageously, the number of cascaded levels of logic used to perform instruction classification may be reduced with respect to performing instruction classification after locating valid instruction bytes. Fewer cascaded levels of logic may enable a shorter clock cycle within microprocessor 200. In one embodiment, the particular byte of the sets of instruction bytes which is assumed to be the beginning of an instruction is the first byte of the set. As used with respect to instruction classification, the term "speculative" refers to performing the classification in parallel with determining valid instruction bytes.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a "start" bit, an "tend" bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode units 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation. A listing of exemplary x86 instructions categorized as fast path instructions as well as a description of the manner of handling both fast path and MROM instructions will be provided further below.

Instruction alignment unit 206 is provided to channel variable byte length instructions from instruction cache 204 to fixed issue positions formed by decode units 208A–208D. In one embodiment, instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the classification of instructions within instruction cache 204, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208D routes displacement and immediate data to a corresponding reservation station unit 210A–210D. Output signals from the decode units 208 include bit-encoded execution instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208D are routed directly to respective reservation station units 210A–210D. In one embodiment, each reservation station unit 210A–210D is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208D is associated with a dedicated reservation station unit 210A–210D, and that each reservation station unit 210A–210D is similarly associated with a dedicated functional unit 212A–212D. Accordingly, four dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al now abandoned. These documents are incorporated herein by reference in their entirety.

Reservation station units 210A–210D are provided to temporarily store instruction information to be speculatively executed by the corresponding functional units 212A–212D. As stated previously, each reservation station unit 210A–210D may store instruction information for up to three pending instructions. Each of the four reservation stations 210A–210D contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212D, the result of that instruction is passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 is configured with a load/store buffer with eight storage locations for data and address information for pending loads or stores. Decode units 208 arbitrate for access to the load/store unit 222. When the buffer is full, a decode unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to sixteen kilobytes of data. It is understood that data cache 224 may be implemented in a variety of specific memory configurations, including a set associative configuration.

Figure 2:
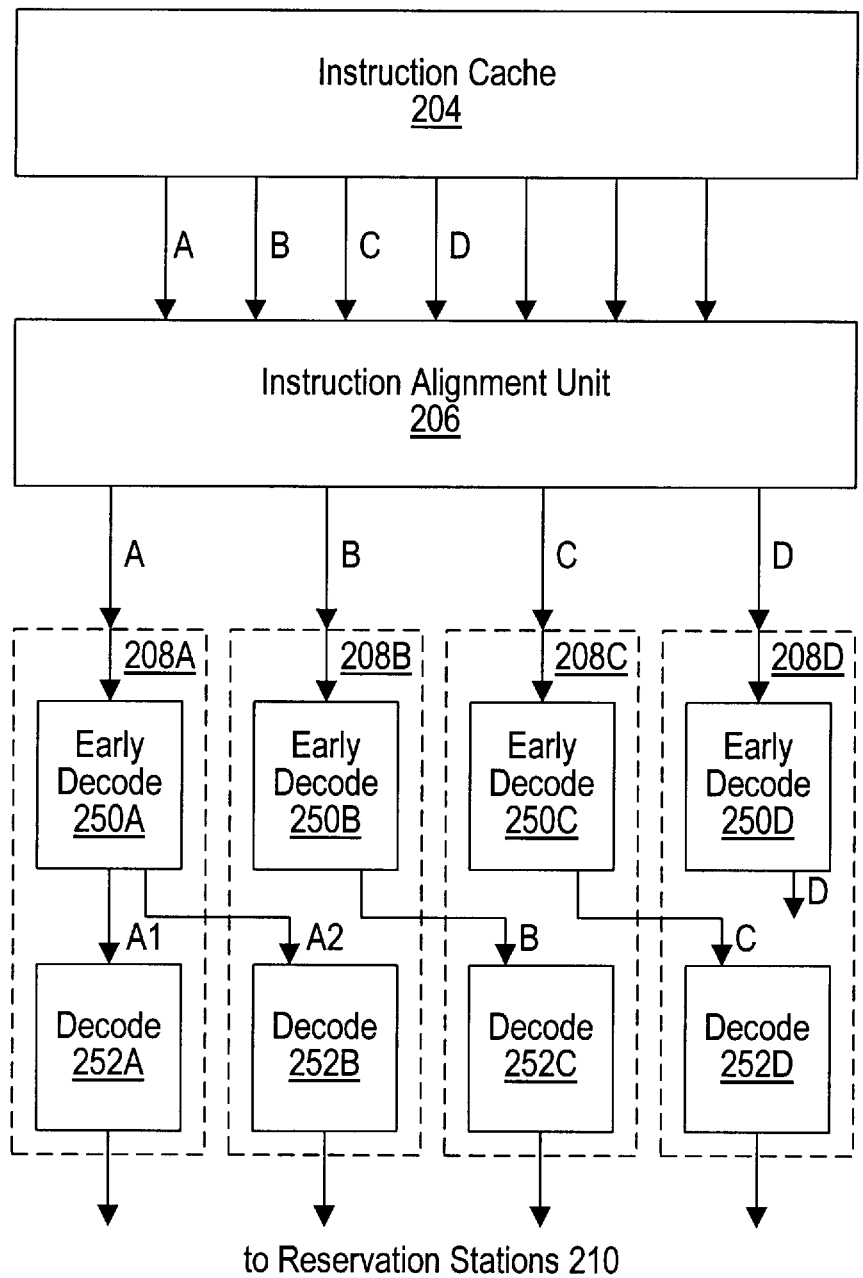
FIG. 2 is a block diagram showing an exemplary instruction flow through several elements shown in FIG. 1.

Turning next to FIG. 2, a portion of microprocessor 200 is shown to illustrate exemplary effects of instructions flowing through microprocessor 200 without performing instruction classification. Instruction cache 204 is shown coupled to instruction alignment unit 206, which is in turn coupled to decode units 208. Decode units 208 are shown to include a pair of pipeline stages in the embodiment of FIG. 2. A pair of decode stages are used in order to decode the complex variable length instructions of the x86 microprocessor architecture. An early decode stage 250A–250D is included in each respective decode unit 208A–208D, as well as a decode stage 252A–252D. Early decode stages 250 perform initial decoding of an instruction, and decode stages 252 perform the remainder of the decoding. In one embodiment, early decode units 252 perform the following decode functions: combining the prefix bytes of an instruction into one encoded prefix byte, decoding unconditional branch instructions (including the CALL and RETURN instruction), verifying the predicted branches, decoding the register operands, generating operand size information, and generating the size of the displacement and/or immediate fields (if included in the instruction). Bit-encoded instructions are conveyed from each decode unit 208A–208D to a respective reservation station 210A–210D.

Exemplary instructions A, B, C, and D are fetched from instruction cache 204 and conveyed to instruction alignment unit 206. Instruction A is a double dispatch instruction according to this example, while instructions B, C, and D are single dispatch instructions. Instruction cache 204 is not configured with the classification circuitry described above in this example. It is noted that although instructions A, B, C, and D are shown conveyed on separate buses in FIG. 2, the instructions may not be conveyed in this manner in microprocessor 200. Instead, a plurality of instruction bytes including instructions A, B, C, and D, as well as related predecode information may be conveyed to instruction alignment unit 206. It is further noted that the predecode information conveyed with the instruction bytes to instruction alignment unit 206 may be modified from the predecode information shown in table 1. Modifications to predecode information may be performed to allow instruction alignment unit 206 to more quickly align instructions. The connections between instruction cache 204 and instruction alignment unit 206 are shown in this manner for illustrative purposes.

Instruction alignment unit 206 aligns instructions to respective decode units 208 in accordance with predecode information provided by instruction cache 204. In the example shown, the predecode information indicates that instructions A, B, C, and D are the next four instructions to be dispatched (i.e. instructions prior to instruction A have been dispatched previously). Because the embodiment of microprocessor 200 shown in FIG. 1 supports the dispatch of four instructions per clock cycle (since there are four decode units 208, reservation stations 210, and execution units 212), instructions A, B, C, and D are concurrently dispatched from instruction alignment unit 206 to decode units 208. Instruction A is transferred to decode unit 208A, instruction B is transferred to decode unit 208B, etc.

Early decode stage 250A receives instruction A and performs early decode upon instruction A. In this embodiment, early decode stages 250 additionally detect the double dispatch instructions within the instruction set of microprocessor 200. Therefore, early decode stage 250A detects that instruction A is a double dispatch instruction. Instruction A is routed as instruction A1 to decode stage 252A and as instruction A2 to decode stage 252B. Early decode stages 250B–250D detect that instructions B, C, and D are single dispatch instructions. However, since instruction A is a double dispatch instruction, instruction B is routed to decode stage 252C and instruction C is routed to decode stage 252D. Instruction D is not routed to a decode stage. Instead, early decode stage 250D communicates with instruction alignment unit 206, causing instruction D to be dispatched again in a subsequent clock cycle.

It is noted that operation according to FIG. 2 includes many disadvantages. First, decode units 208 include bussing between them for transferring instructions determined to be double dispatch instructions. Multiple double dispatch instructions may be detected during a clock cycle, utilizing even more bussing. Decode units 208 additionally communicate with instruction alignment unit 206 to cause retransfer (or redispatch) of instructions which may not progress in the pipeline due to the double dispatch instructions. Such communication may result in a slower clock cycle (due to the propagation time of the communication signals), or may result in stalling of the pipeline such that the redispatched instructions may be inserted.

Figure 2A:
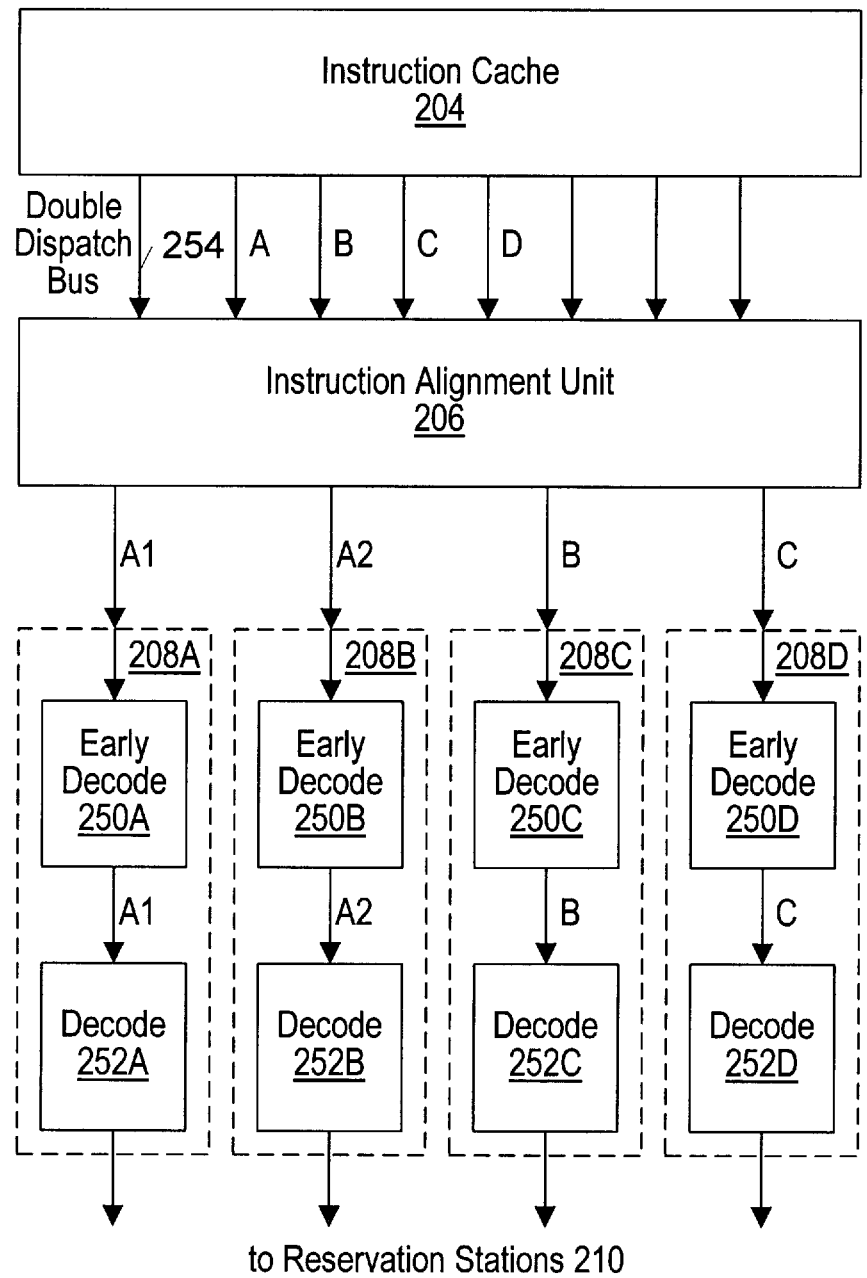
FIG. 2A is a block diagram showing the exemplary instruction flow through the elements shown in FIG. 2, illustrating operation of one embodiment of the present invention.

Turning next to FIG. 2A, the portion of microprocessor 200 shown in FIG. 2 is shown to illustrate instruction flow according to the present invention. Instruction cache 204, instruction alignment unit 206, and decode units 208 (including early decode stages 250 and decode stages 252)

are shown. Instruction bytes including instructions A, B, C, and D are conveyed from instruction cache 204 to instruction alignment unit 206. Instruction A is a double dispatch instruction, while instructions B, C, and D are single dispatch instructions. Additionally, a plurality of double dispatch signals are conveyed upon a double dispatch bus 254 from instruction cache 204 to instruction alignment unit 206. In this example, double dispatch signals associated with instructions A, B, C, and D are conveyed (as well as double dispatch signals associated with other instructions). A double dispatch signal, when asserted, is indicative that the associated instruction is a double dispatch instruction. When deasserted, the double dispatch signal is indicative that the associated instruction is a single dispatch instruction. A signal is asserted when it conveys a value indicative of a particular piece of information (i.e. a double dispatch instruction), and deasserted when not indicative of that particular piece of information. A signal may be asserted when it conveys a logical zero value or, alternatively, when it conveys a logical one value.

The double dispatch signal associated with instruction A is asserted and the double dispatch signal associated with instructions B, C, and D is deasserted. Instruction alignment unit 206 is configured to align instructions with respect to decode units 208 according to predecode information conveyed with the instructions. Additionally, the type of instruction as conveyed on double dispatch bus 254 affects the alignment of instructions. If an instruction is indicated to be of single dispatch type, then the instruction is conveyed to the next available decode unit 208 along with an indication that the instruction is a single dispatch type instruction. If an instruction is indicated to be of double dispatch type, then the instruction is conveyed to the next two available decode units 208. According to one embodiment, a double dispatch instruction may be transferred to each of the two decode units 208 along with an indication of the instruction being the first or second portion of the double dispatch instruction. In another embodiment, instructions representing the operations to be performed by the double dispatch instruction are transferred to the respective two decode units 208. It is noted that in one embodiment, instructions are transferred to decode units 208 in program order. The instruction which is first in program order is transferred to decode unit 208A, the instruction which is second in program order is transferred to decode unit 208B, etc. Therefore, the next available decode unit is a decode unit to which an instruction has not yet been assigned during the current clock cycle.

Instruction A is a double dispatch instruction, and is also first in program order with respect to instructions A, B, C, and D. Therefore, instruction A is transferred as instruction A1 to decode unit 208A and as instruction A2 to decode unit 208B. Instruction B is transferred to decode unit 208C, and instruction C is transferred to decode unit 208D. Instruction D is held until a subsequent clock cycle. However, because double dispatch instructions are detected prior to dispatch to decode units 208, stalling of the pipeline may be avoided. Instructions which are dispatched continue through the instruction processing pipeline, and so communication with instruction alignment unit 206 requesting retransfer of previously dispatched instructions may be avoided. Additionally, bussing between decode units 208 may be eliminated.

It is noted that instruction alignment unit 206 may be constructed similar to the instruction alignment unit disclosed in the commonly assigned, co-pending patent application entitled: "A High Speed Instruction Alignment Unit for a Superscalar Microprocessor", Ser. No. 08/421,669 filed Apr. 12, 1995 by Johnson, et al now abandoned. The disclosure of this patent application is incorporated herein by reference in its entirety.

Figure 3:
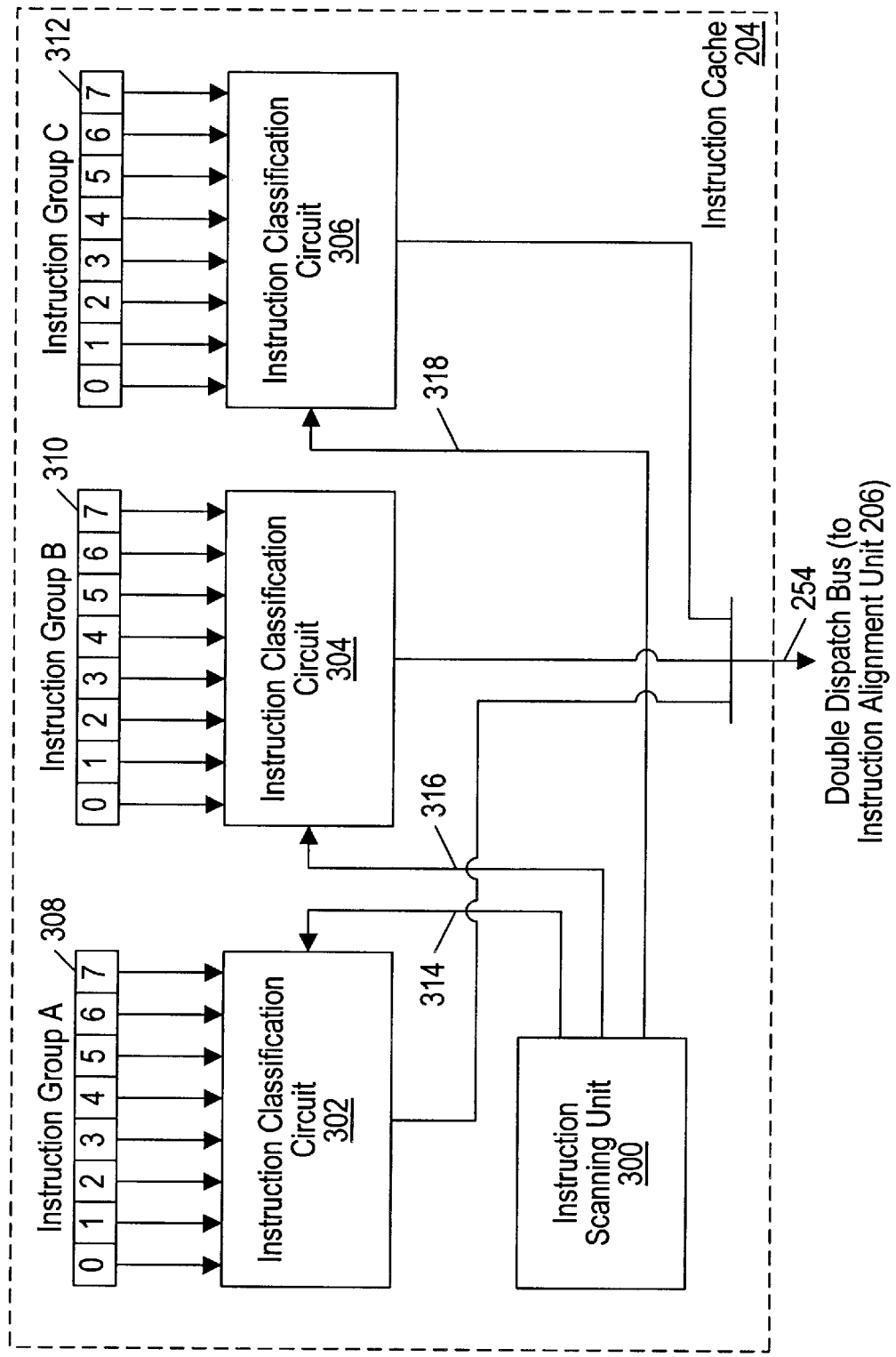
FIG. 3 is a block diagram of one embodiment of the instruction cache shown in FIG. 1, including instruction classifying circuits.

Turning next to FIG. 3, a portion of one embodiment of instruction cache 204 is shown according to the present invention. Included in FIG. 3 are an instruction scanning unit 300, a plurality of instruction classification circuits 302, 304, and 306, and a plurality of instruction groups 308, 310, and 312. Instruction scanning unit 300 is configured to locate instructions within instruction groups 308, 310, and 312 from predecode information associated with each group, and to transfer modified predecode information indicative of valid instructions within each group to instruction alignment unit 206. In one embodiment, instruction scanning unit 300 is configured to locate up to four valid instructions within each instruction group. The four valid instructions are the first four instructions (in program order) found within each instruction group according to the predecode information provided with each instruction group. Additionally, control signals indicative of which bytes within each instruction group are the beginning of instructions located by instruction scanning unit 300 are conveyed to the respective instruction classification circuits upon control buses 314, 316, and 318. It is noted that instruction scanning unit 300 may be configured similar to the instruction scanning unit disclosed within the co-pending, commonly assigned patent application entitled: "A Parallel and Scalable Instruction Scanning Unit", Ser. No. 08/475,400, filed Jun. 7, 1995 by Narayan now abandoned. The disclosure of this patent application is incorporated herein by reference in its entirety.

Instruction groups 308, 310, and 312 are each a plurality of contiguous instruction bytes fetched from the instruction cache storage (not shown) within instruction cache 204. Instruction group 310 may contain instruction bytes contiguous to instruction bytes within instruction group 308. Alternatively, instruction group 310 may contain instruction bytes discontiguous to instruction bytes within instruction group 308. Instruction bytes within instruction group 310 and instruction group 312 may have similar relationships. In one embodiment, instruction groups 308, 310, and 312 comprise instructions which represent the speculative instruction stream being executed by microprocessor 200. For example, instruction group 308 may include a branch instruction which is predicted to be taken. Instruction group 310 would then include instructions residing at the target of the branch instruction. If instruction group 310 does not include a branch instruction, then instruction group 312 includes instruction bytes contiguous to instruction group 310.

Instruction groups 308, 310, and 312 may be fetched from the instruction cache storage during the present clock cycle, or may be stored from a previous clock cycle in which not all of the instructions within the instruction group were dispatched. Additionally, the predecode bits associated with the instruction bytes which are stored from a previous clock cycle are stored. These stored bits are modified to invalidate instructions which are dispatched in a given clock cycle such that new instructions may be dispatched in a subsequent clock cycle. When an instruction group 308 contains no more valid instructions, instruction bytes from instruction group 310 are copied to instruction group 308 and instruction bytes from instruction group 312 are copied to instruction group 310. Instruction group 312 receives new bytes from the instruction storage within instruction cache 204. In one embodiment, each instruction group comprises eight contiguous instruction bytes.

Instruction classification circuits 302, 304, and 306 are configured to classify instructions from the respective instruction groups 308, 310, and 312 into one of a plurality of predefined instruction types. In one embodiment, two instruction types are defined: single dispatch instructions and double dispatch instructions. According to one specific embodiment, x86 instructions classified as double dispatch instructions are listed in tables 2 and 3 below. The remaining x86 instructions are single dispatch instructions, including instructions defined to be MROM instructions. Table 2 shows the prefix, opcode, and MOD R/M bytes of the instructions, and table 3 shows the two operations performed in the respective execution units. Both tables use x86 instruction set syntax. It is noted that an SIB instruction as shown in tables 2 and 3 below is an instruction having an SIB byte.

TABLE 2

Double Dispatch Instruction Opcodes

| Prefix/Opcode/ MODR/M (hex) | Instruction |
|---|---|
| xx/FF/6 | PUSH from memory |
| xx/0E/xx | PUSH from CS |
| xx/16/xx | PUSH from SS |
| xx/1E/xx | PUSH from DS |
| xx/06/xx | PUSH from ES |
| 0F/A0/xx | PUSH from FS |
| 0F/A8/xx | PUSH from GS |
| xx/58/xx | POP into register |
| xx/8C/xx | MOV [memory], sreg |
| xx/F7/4 | MUL |
| xx/F7/5 | IMUL |
| xx/C9/xx | LEAVE |
| xx/E0/xx | LOOP with ZF = 0 |
| xx/E1/xx | LOOP with ZF = 1 |
| xx/E2/xx | LOOP |
| xx/E3/xx | JCXZ & JECXZ |
| xx/E8/xx | CALL near |
| xx/FF/2 | CALL near, register |
| xx/C3/xx | RET near |
| xx/C2/xx | RET near, immediate |
| xx/xx/xx | SIB ins. |

Notes:
xx = not used.
sreg = segment register
near = address within segment

TABLE 3

Double Dispatch Instruction Operations

| Instruction | First Operation | Second Operation |
|---|---|---|
| PUSH from memory | MOV temp, [reg] | SUB ESP, const MOV [ESP], temp |
| PUSH from CS | MOV temp, CS | SUB ESP, const MOV [ESP], temp |
| PUSH from SS | MOV temp, SS | SUB ESP, const MOV [ESP], temp |
| PUSH from DS | MOV temp, DS | SUB ESP, const MOV [ESP], temp |
| PUSH from ES | MOV temp, ES | SUB ESP, const MOV [ESP], temp |
| PUSH from FS | MOV temp, FS | SUB ESP, const MOV [ESP], temp |
| PUSH from GS | MOV temp, GS | SUB ESP, const MOV [ESP], temp |
| POP into register | MOV reg, [ESP] | ADD ESP, const |
| MOV [memory], sreg | MOV temp, sreg | MOV [memory], temp |
| MUL | MUL A, reg | NOOP D |
| IMUL | IMUL A, reg | NOOP D |
| LEAVE | ADD ESP, ESP + const | MOV EBP, [EBP] |
| LOOP with ZF = 0 | SUB C, 1 | JMP rel8 |
| LOOP with ZF = 1 | SUB C, 1 | JMP rel8 |
| LOOP | SUB C, 1 | JMP rel8 |
| JCXZ & JECXZ | SUB C, 0 | JMP rel8 |
| CALL near | SUB ESP, const MOV [ESP], EIP | JMP rel16 CMP branch |
| CALL near, reg | SUB ESP, const MOV [ESP], EIP | JMP rel16 CMP branch |
| RET near | MOV EIP, [ESP] | ADD ESP, const |
| RET near, imm. | MOV EIP, [ESP] | ADD ESP, const + imm. |
| SIB ins. | ADD base, index | OP reg, base + disp |

Notes:
temp = temporary storage location.
reg = register
sreg = segment register
near = address within segment
const = constant (dependent on operand size)
rel8 = 8-bit relative address
rel16 = 16-bit relative address
base = base indicated by SIB byte
index = index indicated by SIB byte
OP = operation defined by instruction including SIB byte The 0F prefix byte, when used in fast path instructions, is located immediately prior to the opcode byte. The MOD R/M (or address mode) byte, is located immediately subsequent to the opcode byte in fast path instructions. Therefore, by speculatively decoding each set of three contiguous instruction bytes within an instruction group, possible double dispatch instructions may be located. When instruction scanning unit 300 has detected the valid instructions within an instruction group, the appropriate double dispatch signals may be selected from the speculatively generated double dispatch signals. It is noted that each instruction classification circuit conveys the portion of double dispatch bus 254 associated with the respective instruction groups. For example, instruction classification circuit 302 conveys the double dispatch signals associated with the first four valid instructions in instruction group 308. Similarly, instruction classification circuit 304 conveys the double dispatch signals associated with the first four valid instructions within instruction group 310, etc.

It is noted that, although FIG. 3 shows three instruction classification circuits 302, 304, and 306 associated with three instruction groups 308, 310, and 312, any number of instruction groups and instruction classification circuits may be included. Additionally, each instruction group is shown in FIG. 3 as including eight contiguous instruction bytes. However, any number of contiguous instruction bytes may form an instruction group according to the present invention. It is further noted that other embodiments may include different instructions as double dispatch instructions.

Figure 3A:
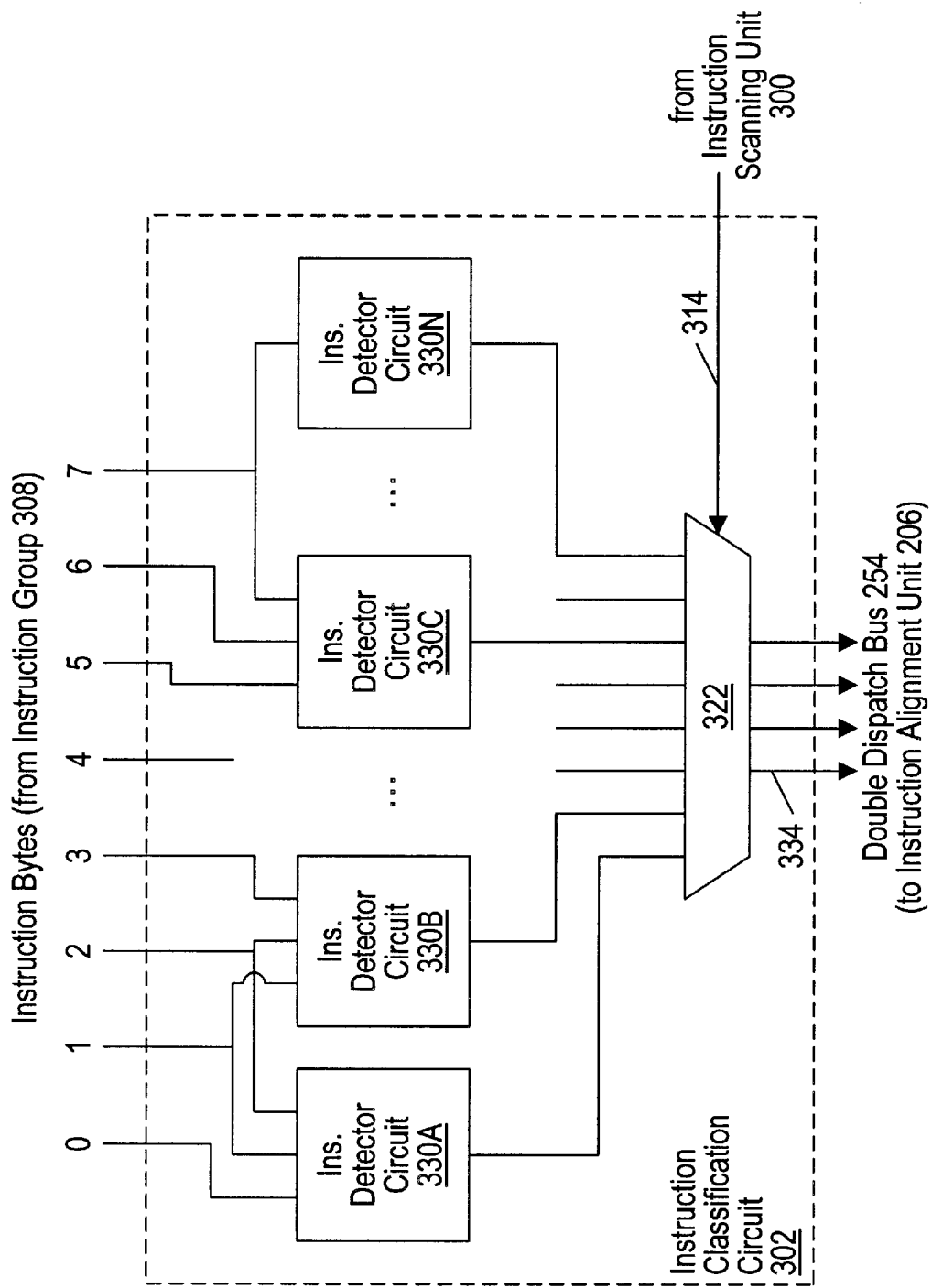
FIG. 3A is a block diagram of one embodiment of the instruction classifying circuits shown in FIG. 3.

Turning now to FIG. 3A, a block diagram of one embodiment of instruction classification circuit 302 is shown. Instruction classification circuits 304 and 306 may be configured similarly. Instruction classification circuit 302 includes a plurality of instruction detector circuits 330A–330N (collectively referred to as instruction detector circuits 330) and a selection device 332. Selection device 332 receives control signals upon control bus 314 from instruction scanning unit 300.

Each instruction detector circuit 330 is configured to operate upon a plurality of contiguous instruction bytes beginning with a particular byte. For example, instruction detector circuit 330A operates upon contiguous instruction bytes beginning with instruction byte zero. Instruction detector circuit 330B operates upon contiguous instruction bytes beginning with instruction byte one, etc. In one embodiment, each instruction detector circuit 330 is configured to operate upon three contiguous bytes. The first byte is assumed to be either a prefix byte or an opcode byte. The second byte is either the opcode byte (if the first byte is a prefix byte) or may be the address mode byte. The third byte may be the address mode byte if the first byte is a prefix byte, otherwise the third byte is ignored.

Instruction detector circuit 330N is configured to classify an instruction beginning at the last byte within instruction group 308. Other instruction bytes which may be included within an instruction beginning at the last byte are not available to instruction detector circuit 330N. Therefore, instruction detector circuit 330N may not perform a complete classification of the instruction. Instead, instruction detector circuit 330N provides a partial classification of the instruction based on the available instruction byte. In one embodiment, instruction detector circuit 330N detects if the first byte is prefix byte OF or the opcode is one of those listed in table 2. The information gained from the partial classification may be utilized with partial classifications of the first bytes of the next group of contiguous instruction bytes to create a complete classification of an instruction. In another embodiment, the first two bytes of the subsequent instruction group may be provided to instruction detector circuit 330N. In this embodiment, instruction detector circuit 330N provides a complete classification of an instruction.

In an alternative embodiment, the final bytes of an instruction group are provided with the subsequent instruction group to a subsequent instruction classification circuit. For example, bytes six and seven of instruction group 308 may be provided to instruction classification circuit 304 along with the bytes of instruction group 310. An instruction detector circuit within instruction classification circuit 304 receives the two bytes from instruction group 308 as well as the first byte from instruction group 310. A second instruction detector circuit within instruction classification circuit 304 receives the last byte of instruction group 308 as well as the first two bytes of instruction group 310. Other decoder circuits are configured similar to FIG. 3A.

Each instruction detector circuit 330 is configured to produce a signal indicative of the detected instruction type for the instruction bytes which that instruction detector circuit operates upon. These signals are transferred to selection circuit 332. Selection device 332 is configured to convey a plurality of the signals from instruction detector circuits 330 upon double dispatch bus 254 according to which instruction detector circuits 330 operated upon valid instruction bytes. The control signals received by selection device 332 from instruction scanning unit 300 indicate which instruction bytes are the beginning of instructions, and therefore direct the selection of appropriate instruction detector circuit signals. In one embodiment, selection device 332 is a plurality of multiplexors configured to select up to four signals from instruction detector circuits 330 for transfer to instruction alignment unit 206 upon double dispatch bus 254. The first signal is the double dispatch signal associated with the first valid instruction within the instruction group, the second signal is the double dispatch signal associated with the second valid instruction within the instruction group, etc. For example, if the first valid instruction within the instruction group begins at byte 5, then the signal output from instruction detector circuit 330C is selected as the first signal conveyed upon double dispatch bus 254 (i.e. conductor 334 in FIG. 3A). It is noted that, as used above, the first valid instruction is the instruction which is first in program order within instruction group 308 (i.e. the instruction comprised of the least significant valid bytes within instruction group 308). Similarly, the second valid instruction is the instruction which is second in program order within instruction group 308, etc.

It is noted that instruction detector circuits 330 may be configured to operate upon more or fewer contiguous bytes than the embodiment shown in FIG. 3A. Additionally, the instruction bytes operated upon need not be contiguous. Instead, bytes at noncontiguous locations measured from a particular byte under consideration by a particular instruction detector circuit may be operated upon by that instruction detector circuit.

Figure 4:
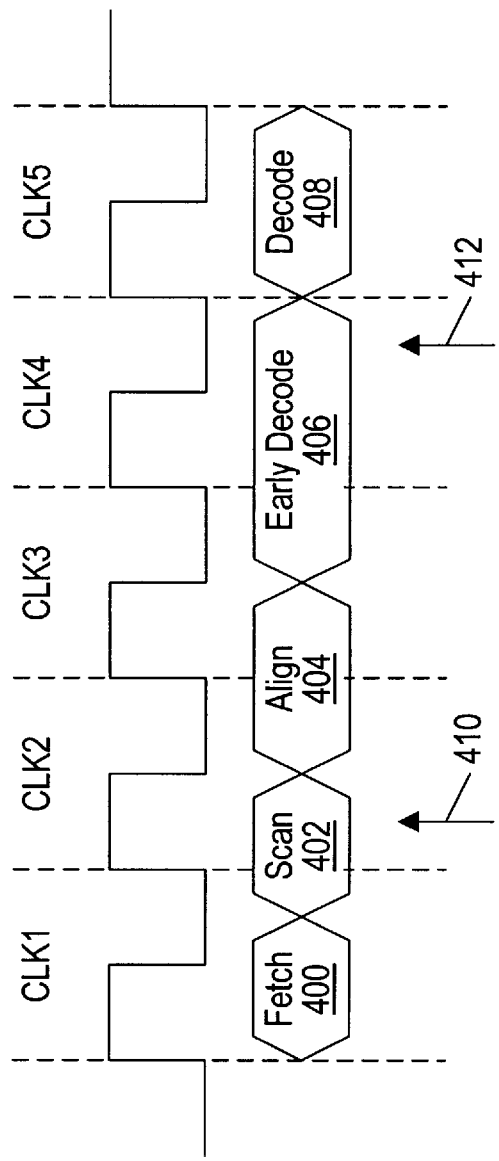
FIG. 4 is a timing diagram of a portion of the instruction processing pipeline of the microprocessor shown in FIG. 1.

Turning now to FIG. 4, a timing diagram of one embodiment of microprocessor 200 is shown. Five clock cycles are shown, labeled as CLK1, CLK2, CLK3, CLK4, and CLK5. During CLK1, a group of instructions are fetched (shown as fetch block 400). Predecode data associated with the fetched instructions is conveyed to instruction scanning unit 300 while the fetched instructions are conveyed to an instruction classification circuit. Instruction scanning unit 300 scans the predecode data to identify valid instructions (scan block 402), while the instruction classification circuit detects possible double dispatch instructions. During CLK2, instructions and the predecode data as modified by instruction scanning unit 300 are transferred to instruction alignment unit 206. Instruction alignment unit 206 aligns the instructions to respective decode units 208 (align block 404). Once the instructions are aligned to a particular decode unit, the instructions enter the early decode stage within the respective decode unit. Early decode functions are then performed upon the instruction (early decode block 406). Upon completion of early decode, instructions progress to the decode stage (decode block 408).

The pipeline stages shown in FIG. 4 do not directly correspond to the fetch, decode, execute and writeback stages describe above. Instead, microprocessor 200 is an example of a microprocessor having multiple stages per pipeline stage. Fetch block 400, scan block 402, and align block 404 comprise the fetch stage. Early decode block 406 and decode block 408 comprise the decode stage.

An arrow 410 is drawn to the point upon the timing diagram of FIG. 4 at which double dispatch instructions are detected in accordance with the present invention. Dashed arrow 412 is drawn to the point upon the timing diagram at which double dispatch instructions are detected without benefit of the present invention. As FIG. 4 shows, double dispatch instructions are detected significantly earlier in the pipeline than was previously achievable. Advantageously, double dispatch instructions may be handled in a much more effective manner. Bussing between units and pipeline stalls due to double dispatch may both be reduced.

Table 4 below is an exemplary listing of fast path and MROM instructions for the x86 instruction set.

TABLE 4

Fast Path and MROM instructions

| x86 Assembly | Fast Path/MROM |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |

TABLE 4-continued

Fast Path and MROM instructions

| x86 Assembly | Fast Path/MROM |
|---|---|
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | fast path |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | fast path |
| JECXZ | fast path |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | fast path |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | fast path |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | fast path |
| NEG | fast path |
| NOP | not sent to functional unit |
| NOT | fast path |
| OR | fast path |
| OUT | MROM |
| OUTS | MROM |
| OUTSB | MROM |
| OUTSW | MROM |
| OUTSD | MROM |
| POP | fast path |
| POPA | MROM |
| POPAD | MROM |
| POPF | MROM |
| POPFD | MROM |
| PUSH | fast path |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | fast path |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | NROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRNSR | MROM |
| XADD | MROM |
| XCHG | MROM |
| XLAT | fast path |
| XLATB | fast path |
| XOR | fast path |

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al now abandoned. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran now U.S. Pat. No. 5,619,464. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al now abandoned. The disclosure of this patent application is incorporated herein by reference in its entirety.

In accordance with the above disclosure, a mechanism is described for detecting instruction types prior to the decode stage of the instruction processing pipeline. Advantageously, instructions may be correctly dispatched without requiring extra bussing between decode units. Additionally, pipeline stalling due to incorrect instruction dispatch may be eliminated. Furthermore, rescheduling of previously dispatched instructions due to incorrect dispatch of instructions may be eliminated. The mechanism described simplifies the process of dispatching instructions while advantageously allowing increased performance.

Numerous variations and modifications will become apparent to those skilled in the art once the above disclosure is fully appreciated. It is intended that the following claims be interpreted to embrace all such variations and modifications.

What is claimed is:

1. A method of classifying an instruction into one of a plurality of instruction types, comprising:
    speculatively selecting one of said plurality of instruction types to which said instruction belongs, wherein one of the plurality of instruction types includes a double dispatch instruction, wherein the double dispatch instruction is defined by a single instruction dispatched to a pair of decode units, said selecting performed in parallel with locating said instruction within a plurality of contiguous instruction bytes; and
    verifying said speculatively selecting by scanning predecode information associated with said plurality of contiguous instruction bytes to locate said instruction.

2. The method as recited in claim 1 wherein said speculative selecting and said verifying are performed within a pipeline stage of an instruction processing pipeline.

3. The method as recited in claim 2 wherein said pipeline stage comprises a fetch pipeline stage.

4. The method as recited in claim 2 further comprising conveying said one of said plurality of instruction types together with said instruction to a subsequent pipeline stage.

5. The method as recited in claim 4 wherein said subsequent pipeline stage comprises a decode pipeline stage.

6. The method as recited in claim 1 wherein said plurality of instruction types comprises a pair of instruction types.

7. The method as recited in claim 6 wherein one of said pair comprises a single dispatch instruction.

8. The method as recited in claim 7 wherein said single dispatch instruction is decoded by a single decode unit.

9. The method as recited in claim 1 wherein said predecode information comprises a plurality of predecode bits associated with said plurality of contiguous instruction bytes.

10. The method as recited in claim 9 wherein said plurality of predecode bits includes a set of predecode bits associated with each one of said plurality of contiguous instruction bytes.

11. The method as recited in claim 10 wherein said set of predecode bits comprises a start bit indicative of the beginning of said instruction.

12. The method as recited in claim 11 wherein said scanning comprises finding a first start bit within said plurality of predecode bits.

13. An instruction classification circuit configured to classify instructions within a plurality of instruction bytes into a plurality of instruction types, comprising:
    a plurality of instruction detector circuits, wherein each one of said plurality of instruction detector circuits is configured to classify an instruction beginning at a respective one of said plurality of instruction bytes into one of said plurality of instruction types, wherein one of the plurality of instruction types includes a double dispatch instruction, wherein the double dispatch instruction is defined by a single instruction dispatched to a pair of decode units, and to convey a signal indicative of said one of said plurality of instruction types; and
    a selection device coupled to receive an instruction location signal identifying which of said plurality of instruction bytes are the beginning of an instruction, wherein said selective device is configured to select a plurality of output signals from a plurality of said signals, and wherein said one of said plurality of instruction bytes corresponding to said plurality of output signals is identified by said instruction location.

14. The instruction classification circuit as recited in claim 13 wherein said selection device comprises a plurality of multiplexors.

15. The instruction classification circuit as recited in claim 13 wherein said selection device is coupled to an instruction scanning unit configured to to generate said instruction location signal by scanning predecode data associated with said plurality of instruction bytes.

16. The instruction classification circuit as recited in claim 13 wherein said plurality of instruction types comprises a pair of instruction types.

17. The instruction classification circuit as recited in claim 16 wherein one of said pair of instruction types is a single dispatch instruction.

18. The instruction classification circuit as recited in claim 13 wherein said plurality of instruction bytes are provided by an instruction cache.

19. The instruction classification circuit as recited in claim 13 wherein said each one of said instruction detector circuits is coupled to receive multiple contiguous instruction bytes beginning with said respective one of said plurality of instruction bytes.

20. The instruction classification circuit as recited in claim 19 wherein said multiple contiguous instruction bytes comprise three instruction bytes.

21. The instruction classification circuit as recited in claim 19 wherein said each one of said plurality of detector circuits decodes said multiple contiguous instruction bytes to perform said classification.

* * * * *